United States Patent
Sekiguchi

(10) Patent No.: US 10,678,483 B2
(45) Date of Patent: Jun. 9, 2020

(54) INFORMATION PROCESSING APPARATUS, METHOD FOR CONTROLLING INFORMATION PROCESSING APPARATUS HAVING PLURALITY OF WIRELESS INTERFACES TO DETERMINE DIRECT CONNECTION WITH A COMMUNICATION APPARATUS

(71) Applicant: CANON KABUSHIKI KAISHA, Tokyo (JP)

(72) Inventor: Shiho Sekiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/971,801

(22) Filed: May 4, 2018

(65) Prior Publication Data
US 2018/0329655 A1    Nov. 15, 2018

(30) Foreign Application Priority Data

May 12, 2017  (JP) ................................ 2017-095917

(51) Int. Cl.
| | |
|---|---|
| *G06F 15/16* | (2006.01) |
| *G06F 3/12* | (2006.01) |
| *G06F 3/0482* | (2013.01) |
| *H04W 76/14* | (2018.01) |
| *H04W 84/12* | (2009.01) |

(52) U.S. Cl.
CPC .......... *G06F 3/1204* (2013.01); *G06F 3/0482* (2013.01); *G06F 3/1209* (2013.01); *G06F 3/1236* (2013.01); *G06F 3/1292* (2013.01); *H04W 76/14* (2018.02); *G06F 3/128* (2013.01); *H04W 84/12* (2013.01)

(58) Field of Classification Search
CPC .... G06F 3/1204; G06F 3/0482; G06F 3/1236; G06F 3/1292; G06F 3/1209; G06F 3/128; H04W 76/14; H04W 84/12
USPC ....................................... 709/227; 358/1, 15
See application file for complete search history.

(56) References Cited

U.S. PATENT DOCUMENTS

| | | | |
|---|---|---|---|
| 2005/0148326 A1* | 7/2005 | Nogawa | .............. H04L 41/0806 455/420 |
| 2006/0002352 A1* | 1/2006 | Nakamura | .......... H04L 41/0816 370/338 |

(Continued)

FOREIGN PATENT DOCUMENTS

| | | |
|---|---|---|
| JP | 2002-344458 A | 11/2002 |
| JP | 2002-345027 A | 11/2002 |

(Continued)

*Primary Examiner* — Frantz B Jean
(74) *Attorney, Agent, or Firm* — Canon U.S.A., Inc. IP Division

(57) ABSTRACT

A method includes determining whether a plurality of wireless interfaces of an information processing apparatus is in a state of being a target for direct connection to a communication apparatus via a wireless LAN, checking whether a number of the wireless interfaces determined as being in the state of the target for the direct connection is plural, and deciding from the plurality of wireless interfaces in the state of being the target for the direct connection, one wireless interface to be directly connected to the communication apparatus in a case where the number of the wireless interfaces determined to be in the state of being the target for the direct connection is plural.

26 Claims, 13 Drawing Sheets

(56) References Cited

U.S. PATENT DOCUMENTS

| | | | | |
|---|---|---|---|---|
| 2013/0137373 A1* | 5/2013 | Choi | ................... | H04B 5/0031 455/41.1 |
| 2013/0148149 A1* | 6/2013 | Park | ................... | G06F 3/1296 358/1.13 |
| 2013/0196702 A1* | 8/2013 | Shibata | ................ | H04W 76/10 455/509 |
| 2013/0229685 A1* | 9/2013 | Naruse | ................. | G06F 3/1207 358/1.15 |
| 2014/0268224 A1* | 9/2014 | Inoue | ................... | G06F 3/1211 358/1.15 |
| 2014/0293331 A1* | 10/2014 | Asai | ..................... | G06F 3/1286 358/1.15 |
| 2014/0355047 A1* | 12/2014 | Lee | ...................... | G06F 3/1292 358/1.15 |
| 2015/0038086 A1* | 2/2015 | Kim | ....................... | G06F 21/35 455/41.3 |
| 2015/0126115 A1* | 5/2015 | Yun | ...................... | H04L 63/0492 455/41.1 |

FOREIGN PATENT DOCUMENTS

| | | |
|---|---|---|
| JP | 2004-253974 A | 9/2004 |
| JP | 2016-19042 A | 2/2016 |
| JP | 2016-042682 A | 3/2016 |

\* cited by examiner

FIG.9

WIRELESS INTERFACE SELECTION

SELECT WIRELESS INTERFACE TO BE USED FOR SETUP.

| NAME OF WIRELESS INTERFACE | STATUS |
|---|---|
| WIRELESS INTERFACE A | UNCONNECTED |
| WIRELESS INTERFACE B | CURRENTLY IN DIRECT CONNECTION |

901  902

SELECT

FIG.10

| ERROR |
|---|
| NO DIRECTLY-CONNECTABLE WIRELESS INTERFACE IS FOUND.<br><br>OK |

INFORMATION PROCESSING APPARATUS, METHOD FOR CONTROLLING INFORMATION PROCESSING APPARATUS HAVING PLURALITY OF WIRELESS INTERFACES TO DETERMINE DIRECT CONNECTION WITH A COMMUNICATION APPARATUS

BACKGROUND

Field

The present disclosure relates to an information processing apparatus, a method for controlling the information processing apparatus, and a non-transitory computer-readable storage medium. In particular, the present disclosure relates to a wireless connection technique.

Description of the Related Art

Information processing apparatuses such as personal computers and smartphones can connect to communication apparatuses such as printers via networks configured by access points. That is, apparatuses in such an infrastructure connection are connected to each other via wireless local area network (LAN) access points. If an access point includes a router function (hereinafter, referred to as "wireless LAN router"), an information processing apparatus can connect to the Internet via the wireless LAN router. There are techniques for preventing a peer-to-peer wireless connection (hereinafter, sometimes referred to as "direct connection") between a communication apparatus and an information processing apparatus in such an infrastructure connection state (refer to Japanese Patent Application Laid-Open No. 2016-19042).

According to Japanese Patent Application Laid-Open No. 2016-19042, when the information processing apparatus includes only one wireless interface, if the one wireless interface is used to connect to the communication device, wireless connections with other devices, including a connection to the Internet, are disconnected. In view of this, Japanese Patent Application Laid-Open No. 2016-19042 discusses a technique for preventing direct connections.

However, there can be cases in which one information processing apparatus includes a plurality of wireless interfaces. For example, a wireless interface can be added with ease by connecting to the information processing apparatus using a wireless slave unit as an adapter.

SUMMARY

According to an aspect of the present invention, a method for controlling an information processing apparatus capable of directly connecting to a communication apparatus via a wireless local area network (LAN) without involving an external access point includes determining whether each of a plurality of wireless interfaces of the information processing apparatus is in a state of being a target for direct connection to the communication apparatus via the wireless LAN, checking whether a number of the plurality of wireless interfaces determined to be in the state of being the target for the direct connection is plural, and deciding from the plurality of wireless interfaces in the state of being the target for the direct connection, one wireless interface to be directly connected to the communication apparatus in a case where the number of the plurality of wireless interfaces determined as being in the state of being the target for the direct connection is plural.

Further features of the present disclosure will become apparent from the following description of exemplary embodiments with reference to the attached drawings.

BRIEF DESCRIPTION OF THE DRAWINGS

FIG. 9 is a diagram schematically illustrating a selection screen for selecting a wireless interface according to an exemplary embodiment.

FIG. 10 is a diagram schematically illustrating an error screen indicating that a direct connection is not possible according to an exemplary embodiment.

DESCRIPTION OF THE EMBODIMENTS

Various exemplary embodiments will be described below with reference to the drawings. The exemplary embodiments described below are not intended to limit the scope of the present disclosure, and not every combination of features described in the exemplary embodiments is always essential to a technical solution of the present disclosure. Each exemplary embodiment is directed to an information processing apparatus that includes a plurality of wireless interfaces and can perform a wireless direct connection with a communication apparatus as appropriate.

In the below-described exemplary embodiments, a personal computer (PC) or smartphone will be described as an example of the information processing apparatus, and a printer (printing apparatus) will be described as an example of the communication apparatus that executes predetermined processing. However, the information processing apparatus is not limited to these examples, and the present disclosure is also applicable to various apparatuses other than smartphones such as mobile terminals, note PCs, tablet terminals, personal digital assistants (PDAs), and digital cameras. The communication apparatus is not limited to the printer, and the present disclosure is also applicable to various apparatuses that can wirelessly communicate with the information processing apparatus. For example, where the printer is concerned, the present disclosure is applicable to inkjet printers and laser beam printers. The present disclosure is also to copying machines, facsimile apparatuses, scanner apparatuses, projectors, mobile terminals, smartphones, note PCs, tablet terminals, PDAs, digital cameras, music reproduction devices, televisions, etc. The present disclosure is still also applicable to multi-function peripherals including a plurality of functions, such as copying, facsimile, and print functions.

A first exemplary embodiment will be described below. First, two methods of connecting an information processing apparatus and a communication apparatus via a wireless local area network (LAN) will be described below with reference to FIGS. 1A and 1B.

Figure 1A:
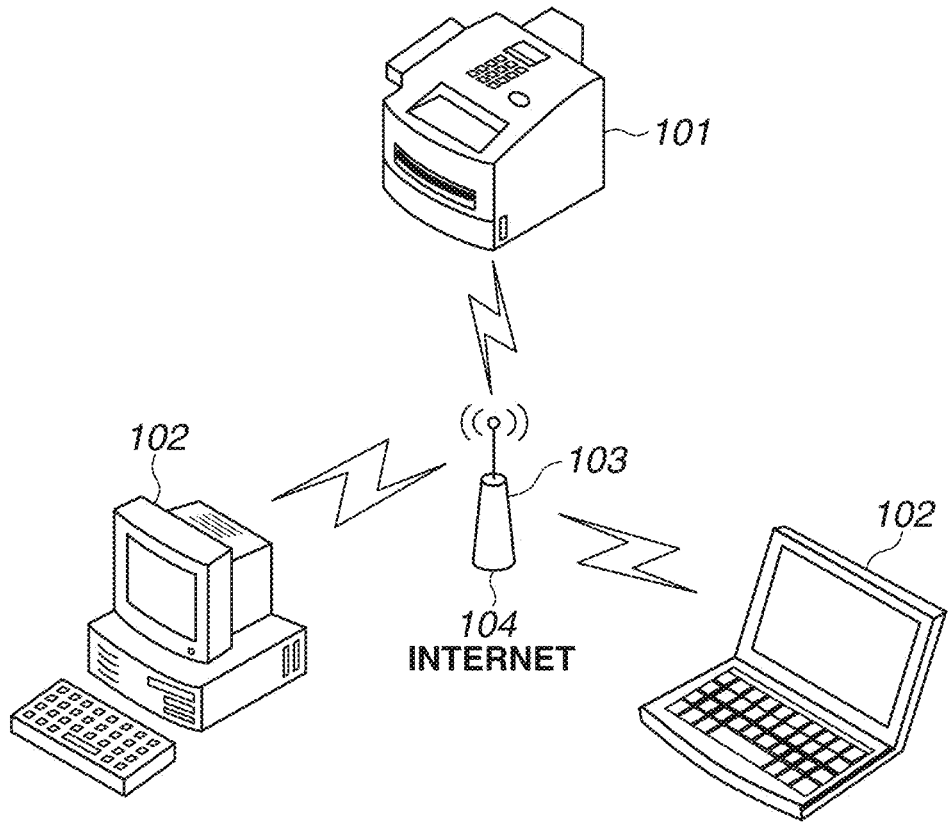
FIGS. 1A and 1B are schematic diagrams illustrating a connection form between a printer and personal computers (PCs).

FIG. 1A illustrates an infrastructure connection. The term "infrastructure connection" refers to an infrastructure mode based on the Institute of Electrical and Electronics Engineers (IEEE) 802.11 standards in which communication is performed via a network configured by an access point. FIG. 1A illustrates a state in which a printer 101, which is the communication apparatus, and information processing apparatuses 102 are connected to each other via a network configured by an external access point 103 in the infrastructure mode. In other words, the printer 101 and the information processing apparatuses 102 communicate with each other via the access point 103. In a case in which the access point 103 in FIG. 1A is a wireless LAN router, the information processing apparatuses 102 are connectable to the Internet 104 via the wireless LAN router.

Figure 1B:
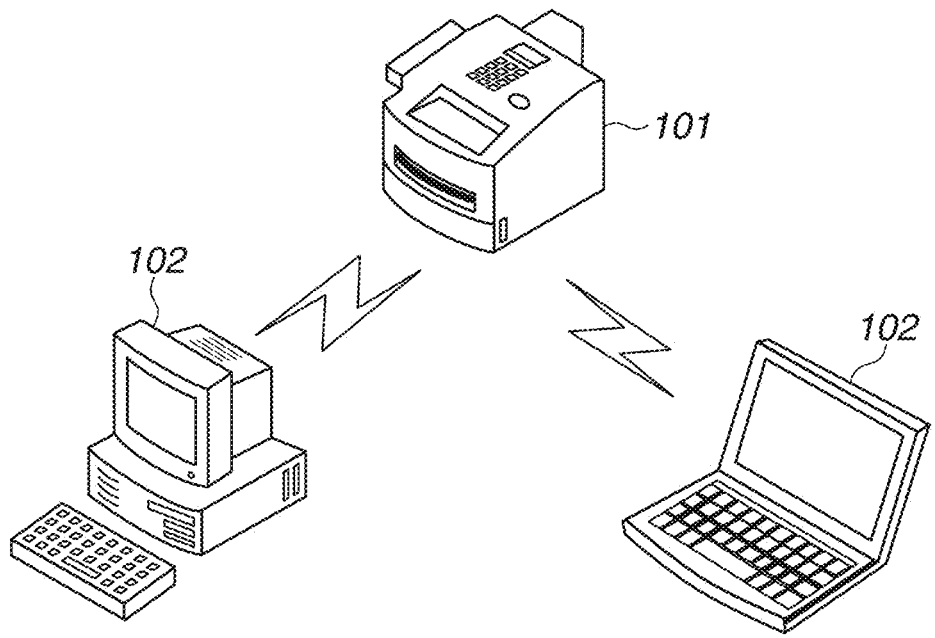

FIG. 1B illustrates a direct connection. The direct connection in the present exemplary embodiment refers to a mode in which apparatuses are connected directly via a wireless LAN without involving the external access point 103, i.e., not connected as illustrated in FIG. 1A. In FIG. 1B, the printer 101 that is the communication apparatus includes an access point function, and the information processing apparatus 102 is directly connected on the wireless LAN to the printer 101 via the access point in the printer 101. One example of a direct connection method in the present exemplary embodiment is a Wi-Fi Direct® method, which is a wireless LAN standard established by the Wi-Fi® Alliance. In a case of a Wi-Fi Direct®-incompatible device, an access point mode method (hereinafter, also referred to as "AP mode method") can be employed in which a communication apparatus communicates using its access point function. Each of the methods is a connection method in which the printer 101 directly functions as an access point. In the case of the direct connection in FIG. 1B, the printer 101 does not include a wide area network (WAN) function, such as a wireless LAN router, and is thus not connectable to the Internet.

In the present exemplary embodiment, the term "wireless LAN" refers to wireless communication according to the IEEE 802.11 standards. In the present exemplary embodiment, IEEE 802.11 includes IEEE 802.11a and IEEE 802.11b belonging in the series of IEEE 802.11 standards.

Next, the hardware configurations of a printer 251 (corresponding to the printer 101 in FIG. 1) and an information processing apparatus 201 (corresponding to the information processing apparatuses 102 in FIG. 1) connected to the printer 251 via a network 231 will be described below with reference to FIG. 2.

[Configuration of Information Processing Apparatus 201]

Figure 2:
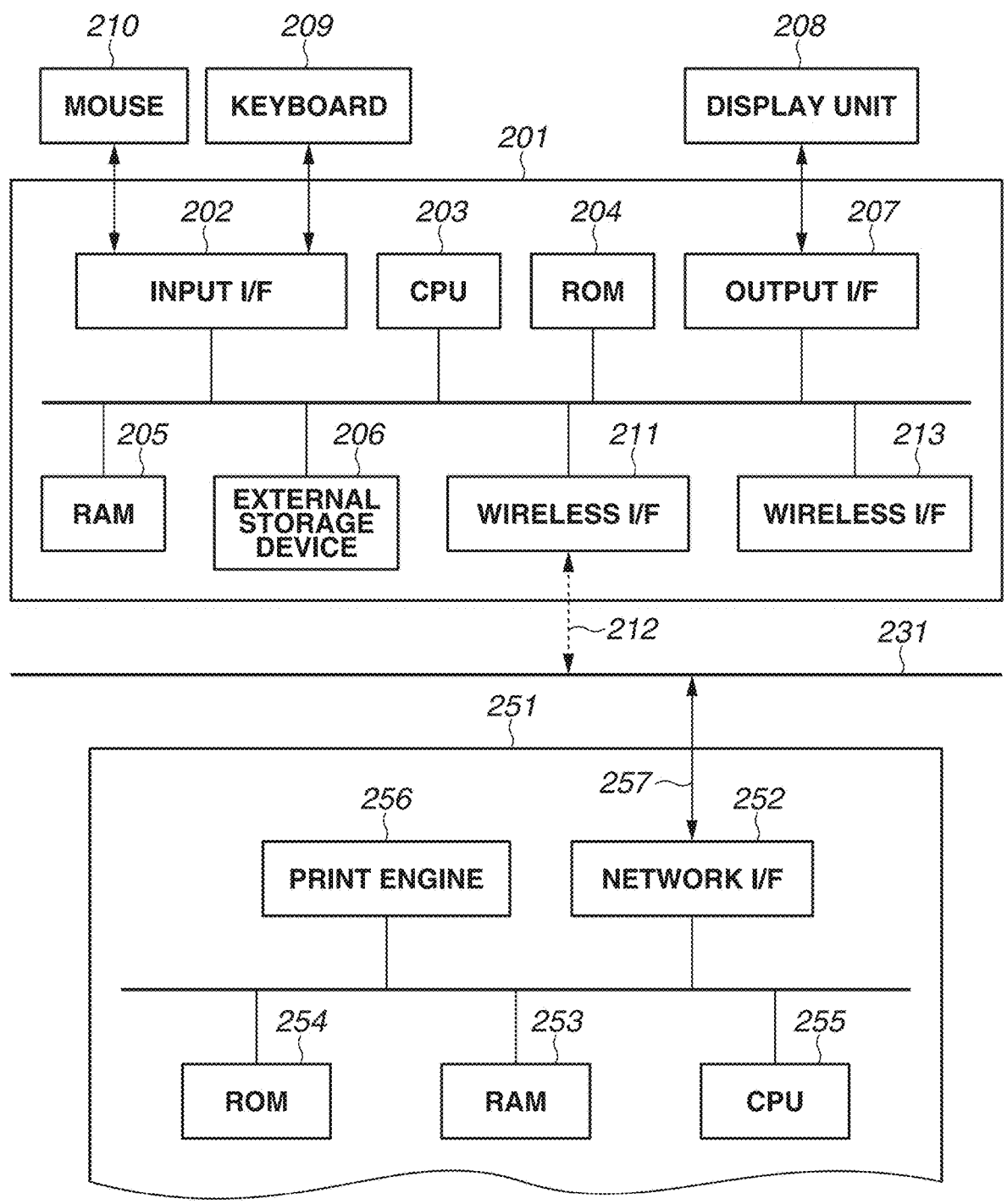
FIG. 2 illustrates an example of the configurations of an information processing apparatus and a communication apparatus according to an exemplary embodiment.

In FIG. 2, the information processing apparatus 201 includes an input interface (I/F) 202, a central processing unit (CPU) 203, a read-only memory (ROM) 204, a random-access memory (RAM) 205, an external storage device 206, and an output I/F 207. The information processing apparatus 201 also includes wireless I/Fs 211 and 213.

The input I/F 202 is an interface that receives data input and operation instructions from the user provided via an operation unit (not illustrated) such as a mouse 210, a physical keyboard 209, a button, and a touch panel. A display unit 208 and the operation unit can be at least partially integrated. For example, screen output and user operation reception can be performed on the same screen.

The CPU 203 is a system control unit and comprehensively controls the information processing apparatus 201, such as program execution and hardware activation.

The ROM 204 is a storage medium that stores control programs executed by the CPU 203 and fixed data such as data tables.

The external storage device 206 is a storage medium that stores an application program group, an operating system (OS), a printer driver, and various types of data. The programs stored in the ROM 204 and the external storage device 206 perform software execution control under the management of the OS, such as scheduling, task switching, and interruption processing. The present exemplary embodiment will be described below using Microsoft® Windows® as the OS as an example.

The RAM 205 is a static random-access memory (SRAM) or a dynamic random-access memory (DRAM), each of which requires a backup power supply. The RAM 205 can hold data using a primary battery (not illustrated) for data backup. In this case, the RAM 205 can store important data such as program control variables without losing the data. The RAM 205 also includes a memory area for storing setting information about the information processing apparatus 201, management data on the information processing apparatus 201, etc. The RAM 205 is used as a main memory for the CPU 203 and a working memory for various programs stored in the ROM 204 and the external storage device 206.

The output I/F 207 is an interface that performs control to cause the display unit 208 to display data and cause the information processing apparatus 201 to issue a state notification.

The display unit 208 is a display that includes a light emitting diode (LED) and a liquid crystal display (LCD) and displays data and a notification of the state of the information processing apparatus 201. A software keyboard including keys, such as a numerical value input key, a mode setting key, a determination key, a cancel key, and a power supply key, can be provided on the display unit 208 to receive user input via the display unit 208.

The wireless I/Fs 211 and 213 connect to the network 231 via a wireless LAN 212. For example, a network interface controller provided in a network adapter, such as a wireless network interface card (NIC), functions as a wireless interface. The number of wireless interfaces of the information processing apparatus 201 is not limited to two as illustrated in FIG. 2, but can be three or more. A wireless interface can be added to the information processing apparatus 201 that originally includes one wireless interface to increase the number of wireless interfaces.

[Configuration of Printer 251]

Next, the printer 251 will be described below. In FIG. 2, the printer 251 includes a network I/F 252, a RAM 253, a print engine 256, a ROM 254, and a CPU 255.

The network I/F 252 is connected to the network 231 via a network cable 257 or wireless LAN.

The RAM 253 is used as a main memory and a working memory of the CPU 255, functions as a reception buffer for temporarily storing received print data of a print job, and stores various types of data. The print engine 256 causes a recording unit (recording head) to execute printing based on the print data stored in the RAM 253. The ROM 254 stores data and various control programs executed by the CPU 255. The CPU 255 is a system control unit and comprehensively controls execution of the programs stored in the ROM 254 and the printer 251.

In the present exemplary embodiment, it can be decided that a wireless interface from the plurality of wireless interfaces of the information processing apparatus 201 is appropriate to use when the information processing apparatus 201 and the printer 251 perform a direct connection via the wireless LAN.

[Case in Which a Plurality of Wireless Interfaces is Included]

A case in which the information processing apparatus 201 includes a plurality of wireless interfaces as described in the present exemplary embodiment will be described below.

An example in which the user is a sales person of a company will be discussed below. Such a user is likely to connect the information processing apparatus 201 and the printer 251 via an infrastructure connection and connect the information processing apparatus 201 to the Internet as illustrated in FIG. 1A. Specifically, in an environment in which there is an external access point, the printer 251 and the information processing apparatus 201 are connected to each other using the wireless LAN via the external access point. In a case in which the external access point is a wireless LAN router, the information processing apparatus 201 is connected to the Internet via the wireless LAN router. When the user is away from the user's office, the user is likely to directly connect the information processing apparatus 201 and the printer 251 to each other as illustrated in FIG. 1B. In this case, it is more efficient to prepare wireless interfaces respectively for infrastructure connection and direct connection than switch over the connection method of one wireless interface of the information processing apparatus 201 each time to connect to the printer 251. That is, the information processing apparatus 201 desirably includes a plurality of wireless interfaces.

It is desirable for the information processing apparatus 201 to include a plurality of wireless interfaces even in the case where the information processing apparatus 201 is in the same location (the same environment). For example, in an environment in which there is an external access point including a wireless LAN router function, the information processing apparatus 201 is on a network configured by the external access point using one wireless interface. The information processing apparatus 201 is connected to a printer A on the same network by an infrastructure connection via the external access point. The information processing apparatus 201 is also connected to the Internet via the wireless LAN router. In this state, if the information processing apparatus 201 establishes a direct connection with a printer B, which is different from the printer A, the information processing apparatus 201 uses a wireless interface (unconnected wireless interface) that is different from the wireless interface used for the infrastructure connection. In this way, the direct connection to the printer B is established without disconnecting the infrastructure connection and the Internet connection of the information processing apparatus 201.

Because of the above-described merit, the information processing apparatus 201 can include a plurality of wireless interfaces. However, in the case in which the information processing apparatus 201 includes a plurality of wireless interfaces, selecting a wireless interface to use for a direct connection at the time of setting up the direct connection is needed because a wireless interface to be directly connected to the communication apparatus needs to satisfy a predetermined condition, but when a plurality of wireless interfaces satisfies the condition, a method for specifying one of the plurality of wireless interfaces is needed.

Even if a wireless interface satisfies the predetermined condition, the interface can be used for a direct connection setup. In the above-described example of the user being a sales person, there can be a case in which a wireless interface for infrastructure connection is moved external to the infrastructure connection area. In this case, it is determined that the wireless interface for infrastructure connection is in an unconnected state. In other words, the wireless interface can satisfy the condition for a wireless interface for use in the direct connection.

[Condition for Wireless Interface to Become Direct Connection Target]

In the present exemplary embodiment, two conditions are set as determination criteria as to whether a wireless interface is a suitable wireless interface target for direct connection.

(Condition 1)

The first condition 1 is that a wireless interface that is a determination target is in the unconnected state. A wireless interface connected to the wireless LAN router via an infrastructure connection is especially likely connected to the Internet via the wireless LAN router. If a direct connection is set up for such a wireless interface, the Internet environment in the information processing apparatus is disconnected, which is a demerit for a user. Thus, a target for direct connection is desirably a wireless interface that is in the unconnected state.

(Condition 2)

The second condition 2 is that a wireless interface that is a determination target is currently in a directly-connected state (the wireless interface is already directly connected) via no external access point. Specifically, the condition 2 is a determination criterion that a wireless interface, if the user previously selected it as a direct connection target, can be selected again as a direct connection target without a problem. The term "directly-connected state" in the condition 2 typically refers to a state in which a wireless interface is already directly connected to a printer with which the user intends to establish a direct connection. However, the present exemplary embodiment is not limited to the above-described case. More specifically, it can be determined that a wireless interface is in the "directly-connected state" if the wireless interface is directly connected to any device. In the former case, it is determined that a wireless interface is "not being in the directly-connected state" if the wireless interface is not directly connected to the printer 251 with which the user intends to establish a direct connection while the wireless interface is directly connected to a device other than the printer 251. In the latter case, it is determined that a wireless interface is "being in the directly-connected state" if the wireless interface is not directly connected to the printer 251 with which the user intends to establish a direct connection while the wireless interface is directly connected to a device other than the printer 251. The determination criterion that is applied of the determination criteria as to the "directly-connected state" is determined based on the setting of a setup program stored in the RAM 205.

As described above, in the present exemplary embodiment, a wireless interface that satisfies either of the two conditions (conditions 1 and 2) is determined as a "wireless interface that is a direct connection target".

[Flow of Control]

Figure 3:
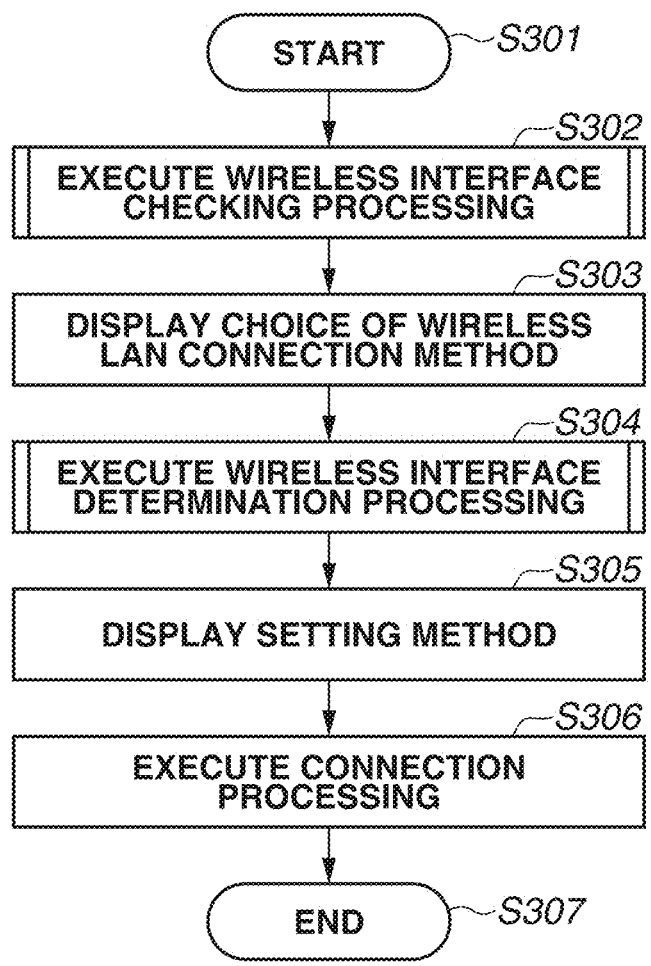
FIG. 3 is a flowchart illustrating a method of controlling an information processing apparatus according to an exemplary embodiment.

Next, a control method of the present exemplary embodiment will be described in detail below. FIG. 3 is a flowchart illustrating a process of directly connecting the information processing apparatus 201 to the printer 251. The flowchart is implemented by, for example, the CPU 203, which reads out and executes a setup program (hereinafter, also referred to simply as "program" or "present program") stored in the external storage device 206, etc. on the RAM 205.

In step S301, the process illustrated in FIG. 3 is started when the program is activated based on a user instruction and an execution instruction is received from the CPU 203. While the program or the OS is sometimes described as an actor of the processing in the following description, the CPU 203 actually executes the corresponding program to realize the corresponding function.

In step S302, the program executes processing to check the state of every wireless interface of the information processing apparatus 201 (hereinafter, the processing will be referred to as "wireless interface checking processing"). Details of the wireless interface checking processing in step S302 will be described below with reference to FIG. 5.

Figure 4:
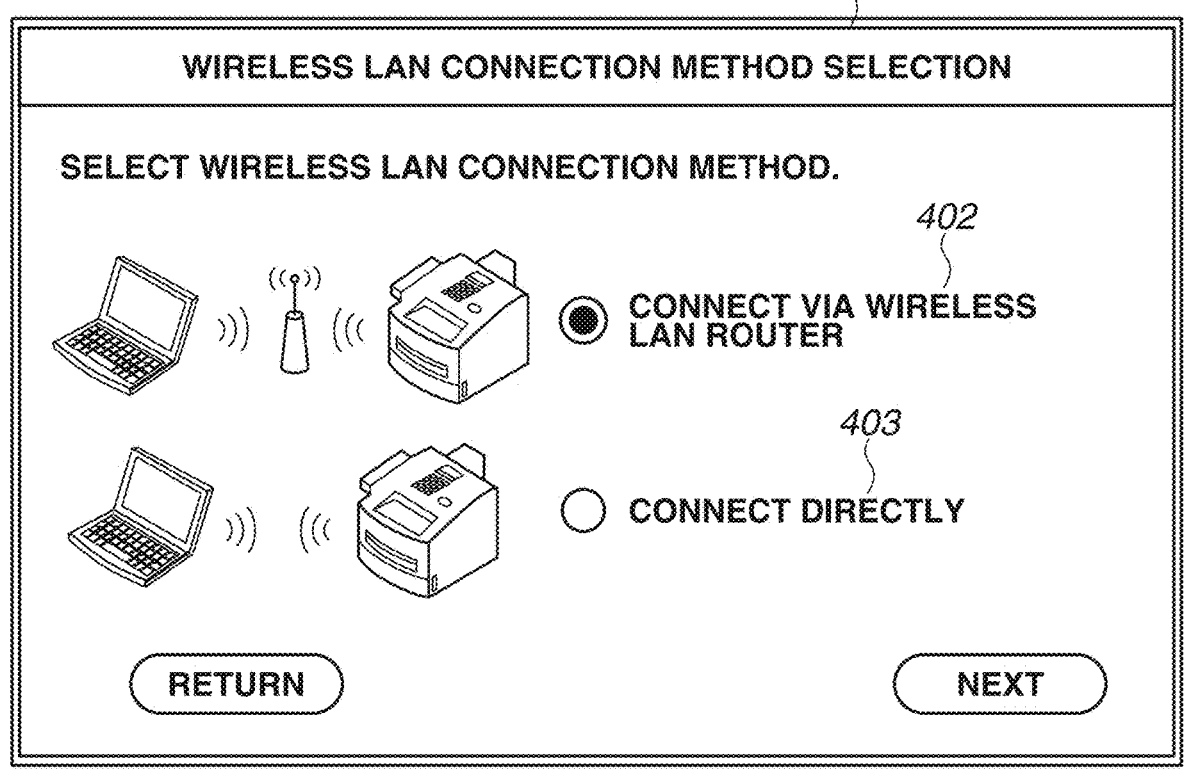
FIG. 4 is a schematic diagram illustrating a selection screen for selecting a wireless local area network (LAN) connection method according to an exemplary embodiment.

In step S303, the program instructs the OS to display a selection screen (selection dialog) of a wireless LAN connection method on the display unit 208, and the OS displays the selection screen on the display unit 208. FIG. 4 illustrates an example of a selection screen 401 of the wireless LAN connection method. The selection screen 401 presents an option 402 "connect via wireless LAN router" and an option 403 "connect directly". The option 402 "connect via wireless LAN router" indicates an infrastructure connection via an external access point, and the option 403 "connect directly" indicates a direct connection via an access point of a printer. In the present exemplary embodiment, an example will be described in which the user selects the option 403 "connect directly" on the selection screen 401 to execute setting-up.

In step S304, the program executes wireless interface decision processing in response to the selection of the direct connection on the selection screen 401 in FIG. 4. Details of the decision processing in step S304 will be described below with reference to FIG. 8.

In step S305, the program instructs the OS to display on the display unit 208 of the information processing apparatus 201 a setting method for shifting the printer 251 to a direct connection mode, and the OS displays a screen of the setting method on the display unit 208.

In step S306, if the printer 251 is shifted to the direct connection mode, the program detects the printer 251 in the direct connection mode state and executes the connection processing.

In step S307, a direct connection between the information processing apparatus 201 and the printer 251 via the wireless LAN is completed via the above-described process. Since, in directly connecting to the printer 251, the access point of the printer 251 is used, in general, the maximum number of terminals (information processing apparatuses) connectable to the printer 251 is set by the printer 251. If the number of terminals exceeds the number of connectable terminals, the processing in step S306 fails, and the process ends.

[Wireless Interface Checking Processing (Step S302)]

Figure 5:
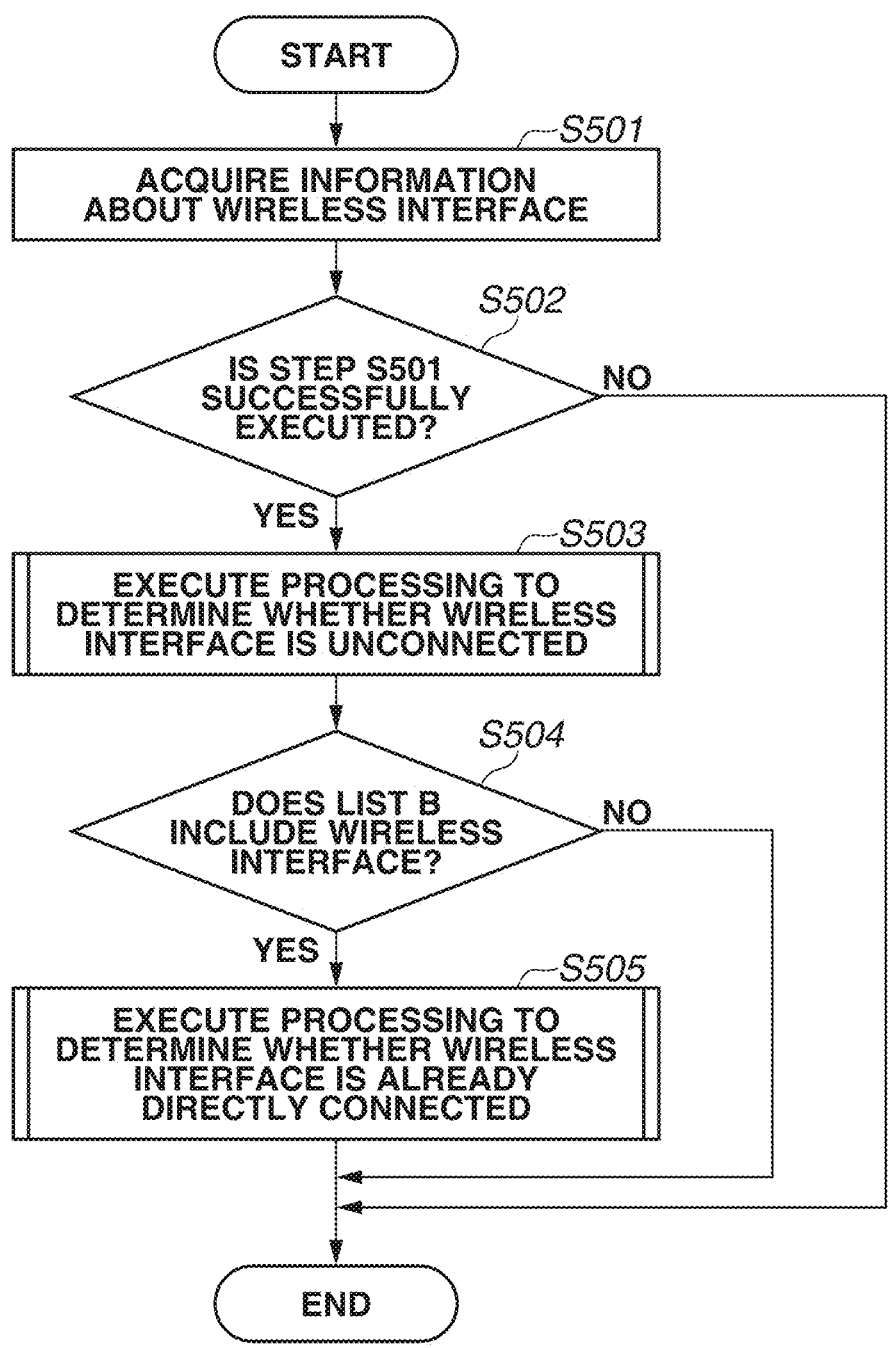
FIG. 5 is a flowchart illustrating a process of checking a wireless interface according to an exemplary embodiment.

Next, details of the wireless interface checking processing (step S302) in the program will be described below with reference to FIG. 5.

In step S501, the program acquires information about wireless interfaces present in the information processing apparatus 201 using an application programming interface (API) of the OS.

In step S502, the program refers to a return value of the API of the OS to determine whether step S501 is successfully executed. If the information processing apparatus 201 includes no enabled wireless interface (NO in step S502), the wireless interface checking processing ends. If the information processing apparatus 201 includes one or more enabled wireless interfaces (YES in step S502), the processing proceeds to step S503. The "enabled wireless interfaces" do not include wireless interfaces that are physically turned off and wireless interfaces that are in a disabled state. If the value IfOperStatusUp(1) is present in the IF OPER STATUS type variable in an IP ADAPTER ADDRESSES structure of the return value of the API, it is determined that the wireless interface is already connected.

In step S503, the program determines whether the wireless interface corresponds to the condition 1 for a direct connection target to determine whether the wireless interface is unconnected. Details of the processing in step S503 will be described below with reference to FIG. 6.

Figure 6:
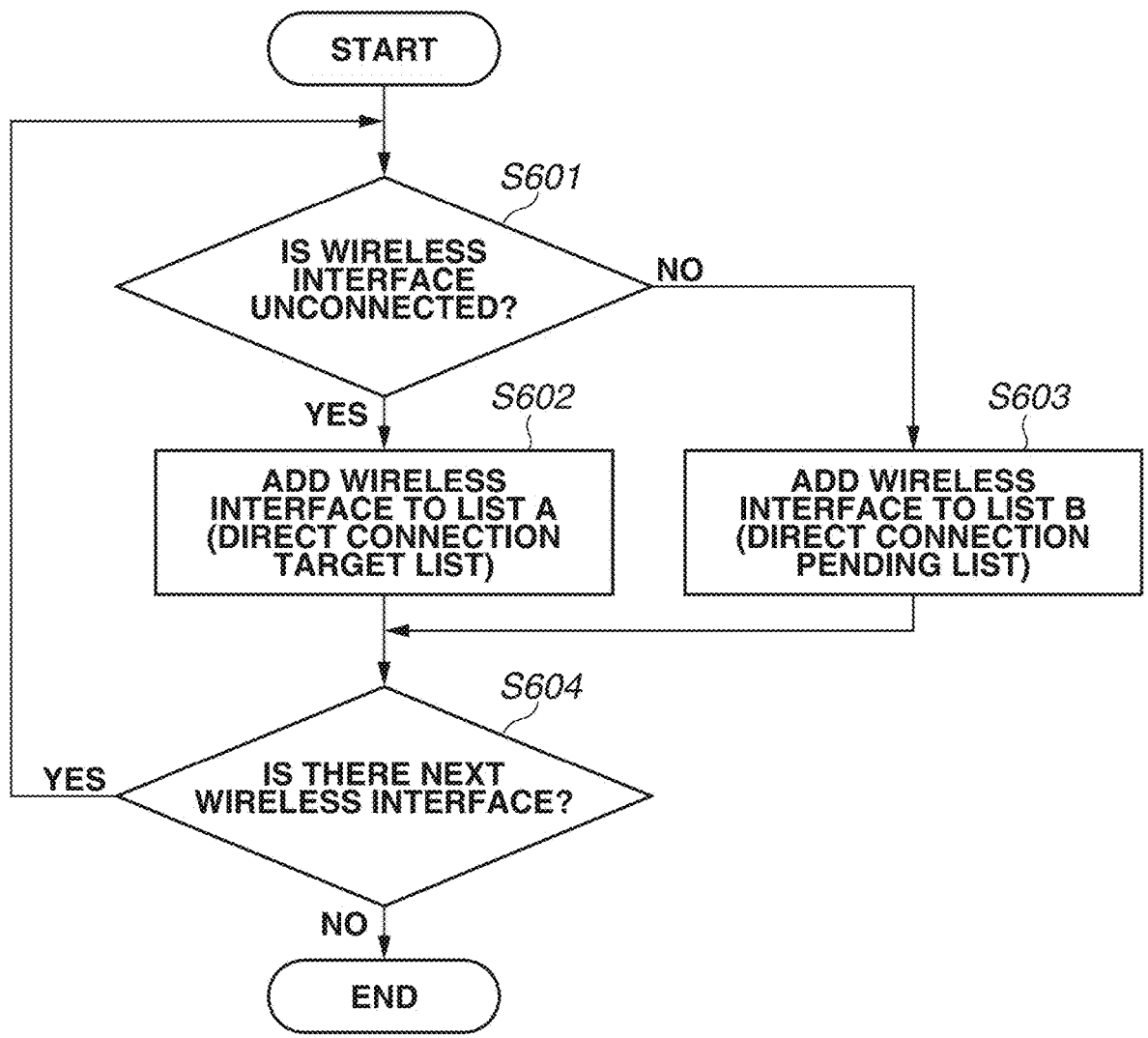
FIG. 6 is a flowchart illustrating a process of determining whether an interface is unconnected according to an exemplary embodiment.

FIG. 6 is a flowchart illustrating the processing executed in step S503. In the process illustrated in FIG. 6, whether the wireless interfaces are in the unconnected state is checked one by one.

In step S601, the program determines whether the first wireless interface (provisionally referred to as "wireless interface X") is in the unconnected state. More specifically, the program refers to a status value (information contained in the return value of the API of the OS) that indicates the connection state of the wireless interface X. Then, if the status value indicates a packet-transmittable state, it is determined that the wireless interface X is in the connected state (NO in step S601). If the status value does not indicate the packet-transmittable state, it is determined that the wireless interface X is in the unconnected state (YES in step S601).

In step S602, the program determines the wireless interface X is in the unconnected state and adds the wireless interface X to a list A (direct connection target list). In step S603, the program determines the wireless interface X is in the connected state and adds the wireless interface X to a list B (direct connection pending list).

In step S604, the program determines whether there is a next wireless interface (provisionally referred to as "wireless interface Y"). If there is the wireless interface Y (YES in step S604), the processing returns to step S601. If there is no next wireless interface (NO in step S604), it is determined that all the wireless interfaces are classified into either the list A or the list B, and the process ends. The description of the flowchart will be continued with reference to FIG. 5.

In step S504, the program determines whether the list B includes a wireless interface based on the determination in step S503 as to whether the wireless interfaces are unconnected. If the list B includes a wireless interface (YES in step S504), the processing proceeds to step S505. If the list B does not include any wireless interface (NO in step S504), the process illustrated in FIG. 5 ends.

In step S505, the program executes processing to determine whether the wireless interface is already directly connected. The processing for determining whether the wireless interface is already directly connected is the processing for determining whether the wireless interface satisfies the condition 2 for a direct connection target. Details of the processing to determine whether the wireless interface is directly connected will be described below with reference to FIG. 7.

Figure 7:
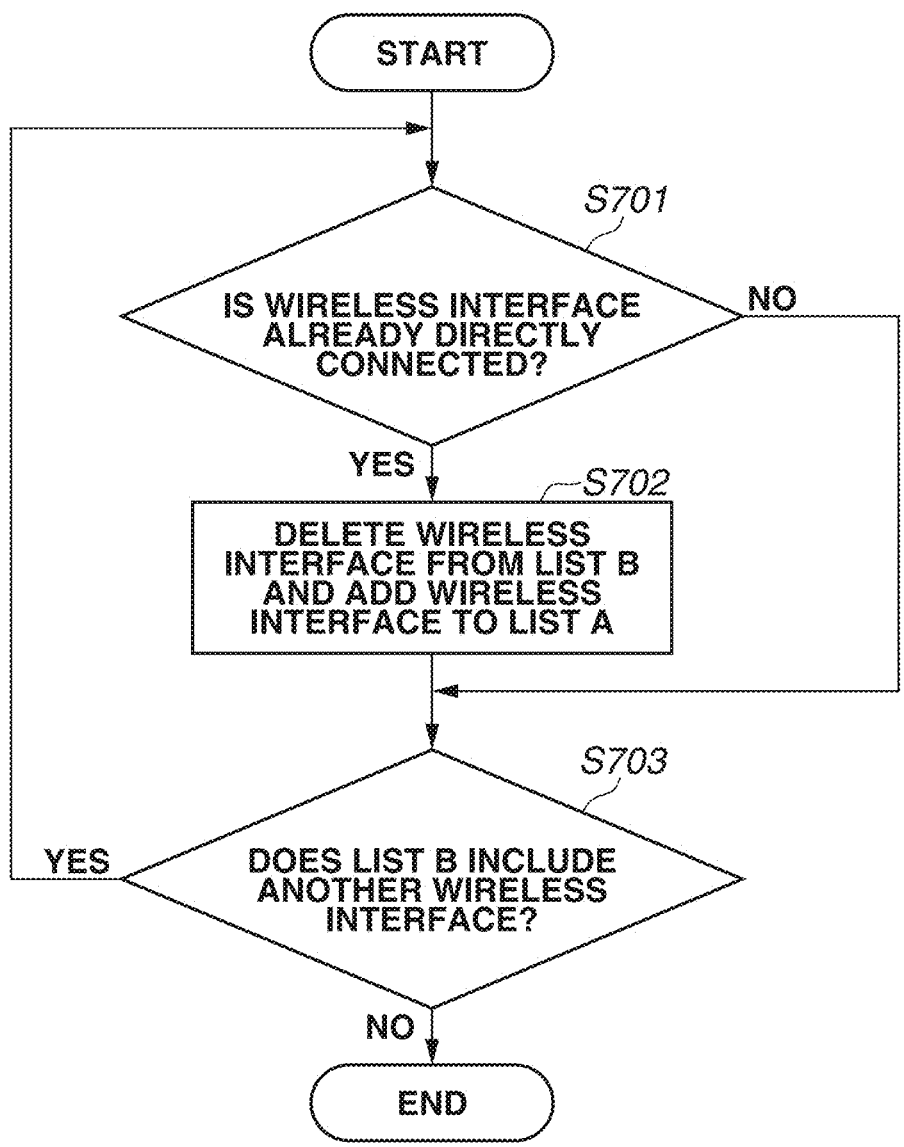
FIG. 7 is a flowchart illustrating a process of determining whether a wireless interface is directly connected according to an exemplary embodiment.

FIG. 7 is a flowchart illustrating processing in step S505. In the processing illustrated in FIG. 7, the program checks with respect to each one of the wireless interfaces of the list B whether to move the wireless interfaces of the list B to the list A. The return value of the API of the OS that is used in the above-described determination in step S501 can be used to determine whether the wireless interface is connected to any interface including the external access point and the access point of the printer 251. However, it is not possible to determine whether the connection destination is the external access point or the access point within the printer 251 (i.e., whether the state is the directly-connected state). Thus, the processing illustrated in FIG. 7 is executed to determine with respect to each wireless interface whether the connection destination is directly connected. As described above in the description of the condition 2, the term "directly-connected state" in the present exemplary embodiment typically refers to a state in which the wireless interface is already directly connected to the printer with which the user intends to establish a direct connection, but the directly-connected state is not limited to this typical example. It can be determined that the wireless interface is in the "directly-connected state" if the wireless interface is directly connected to any device. In the following description of the processing in step S701, an example will be described in which it is determined that the wireless interface is in the "directly-connected state" only if the wireless interface is already directly connected to the printer 251 with which the user intends to establish a direct connection.

In step S701, the program tries to communicate with the current connection destination of the first wireless interface (provisionally referred to as "wireless interface X"). More specifically, the program designates the Internet Protocol (IP) address of the default gateway of the destination to which the wireless interface X connects, and performs a search on the network. The IP address of the default gateway is acquired from the return value of the API of the OS in step S501 described above. In the processing, the present program performs a network search using the Simple Network Management Protocol (SNMP). SNMP is a protocol for monitoring and controlling devices (including both the external access point and the printer 251 including the access point) on the network. The SNMP communication is performed so that the present program of the communication source can acquire device information called a management information base (MIB). If the printer 251 is in the directly-connected state, the printer 251 stores in the ROM 254 a MIB (hereinafter, "direct status MIB") indicating that the printer 251 is a printer in the directly-connected state. The present program tries to acquire the direct status MIB from the connection destination of the wireless interface through SNMP communication. If the program successfully acquires the direct status MIB (YES in step S701), it is determined that the wireless interface X is already directly-connected (being directly-connected), and the processing proceeds to step S702. If the program unsuccessfully acquires the direct status MIB of the printer 251 (NO in step S701), it is determined that the wireless interface X is connected to a device other than the printer 251 (e.g., the external access point or printer other than the printer 251), and the processing proceeds to step S703. In other words, if the wireless interface X is connected to an external device other than the communication apparatus with which a direct connection is to be established, the processing proceeds to step S703.

In step S702, the program deletes the wireless interface X from the list B and adds the wireless interface X to the list A. If the connection destination is not the printer 251 (NO in step S701), the program does not update the lists A and B.

In step S703, the program determines whether the list B includes another wireless interface (provisionally referred to as "wireless interface Y"), which has not undergone the processing in step S701. If the list B includes the wireless interface Y (YES in step S703), the processing returns to step S701. Specifically, the program executes step S701 on every wireless interface included in the list B in step S703. In step S703, if the program determines that step S701 is executed on all the wireless interfaces of the list B (NO in step S703), the process ends.

[Wireless Interface Decision Processing (Step S304)]

Figure 8:
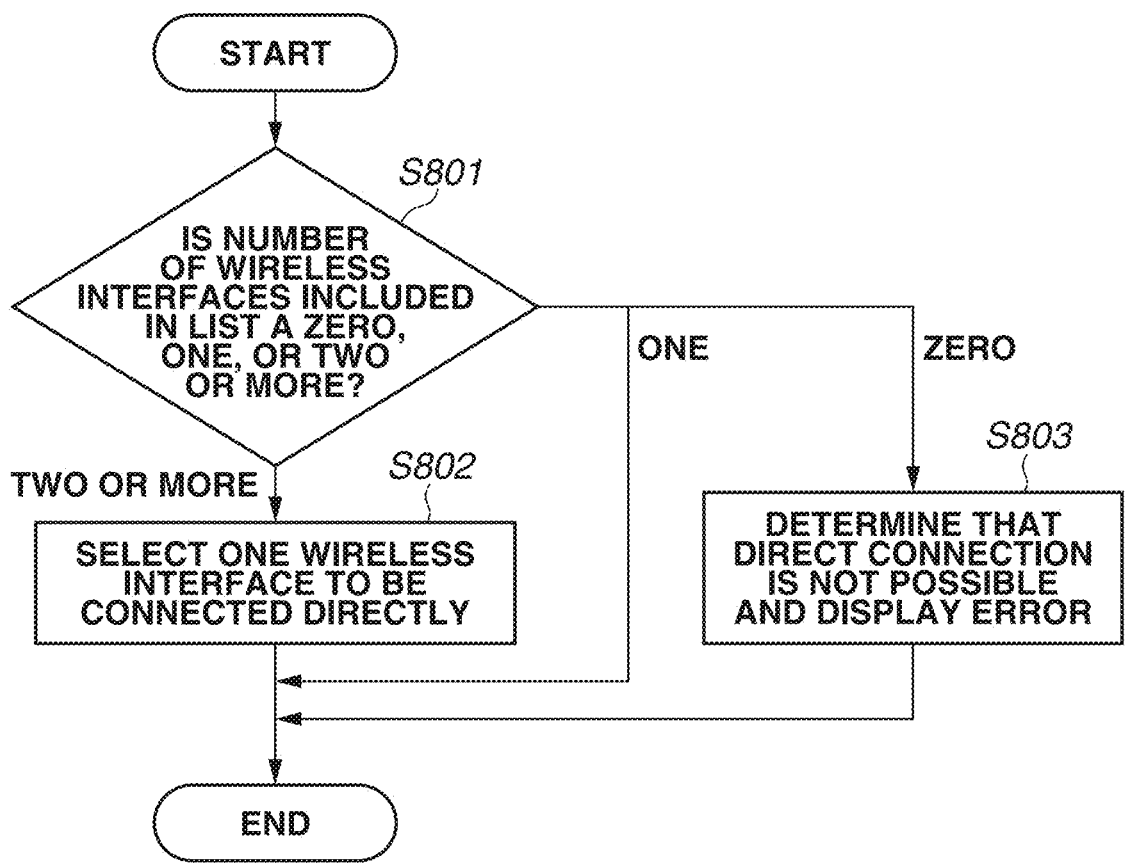
FIG. 8 is a flowchart illustrating a wireless interface decision process according to an exemplary embodiment.

Next, details of the wireless interface decision processing (step S304) in FIG. 3 will be described below with reference to FIG. 8. From step S801, the processing branches into a next step based on the number of wireless interfaces contained in the list A (list of wireless interface targets for direction connection to the printer 251) extracted by the wireless interface checking processing (step S302). More specifically, the number of wireless interfaces contained in the list A is counted. In step S801, if the number of wireless interfaces is two or more (TWO OR MORE in step S801), the processing proceeds to step S802. If the number of wireless interfaces is not two or more but one in step S801 (ONE in step S801), it is determined that the one wireless interface is a wireless interface used to set up a direct connection to the printer 251, and the process ends. If the number of wireless interfaces is not two or more but zero in step S801 (ZERO in step S801), the processing proceeds to step S803.

In step S802, since the list A contains two or more wireless interfaces, the program executes processing to select one wireless interface from the list A. In the present exemplary embodiment, the program instructs the OS to display a selection screen as illustrated in FIG. 9. The selection screen in FIG. 9 displays names 901 (identification information) indicating a plurality of wireless interfaces contained in the list A and information 902 indicating the connection state of each wireless interface. The program presents such a selection screen to the user so that the user can select from the plurality of wireless interface targets for direct connection a wireless interface to be directly connected. When a user instruction is received on the selection screen, the program decides the wireless interface to be directly connected.

In step S803, since there is no direct-connection wireless interface target, the program determines that it is an error state in which direct connection is not possible, and an error screen as illustrated in FIG. 10 is displayed and the process ends.

As described above, in the present exemplary embodiment, even if the information processing apparatus includes a plurality of wireless interfaces, it is determined with respect to each of wireless interfaces whether it is a wireless interface target for direct connection via the wireless LAN. More specifically, the process includes the processing for determining with respect to each wireless interface whether the wireless interface satisfies the unconnected state (condition 1) or the directly-connected state (condition 2) without involving an external access point (wireless interface checking processing step S302). In this way, a wireless interface target for direct connection can be extracted. Then, if there is a plurality of wireless interface targets for direct connection, one wireless interface to be directly connected is decided from among the targets. Specifically, the selection screen is displayed and controlled to prompt the user to select one wireless interface. Thus, the processing is executed so that a suitable wireless interface can be decided.

In another embodiment, different from the present exemplary embodiment, the wireless interface determined earliest as a direct connection target can be automatically used for direct connection without executing step S302 on each (every) one of the plurality of wireless interfaces. Specifically, the wireless interface determined first as the direct connection target during the sequential execution of step S302 on the plurality of wireless interfaces can automatically be used for direct connection. However, in such a case, if the first wireless interface is determined as a target for direct connection, step S302 is not executed on the second and other wireless interfaces. Thus, while there can be another wireless interface target for direct connection, the state of the other wireless interface is not determined. Therefore, it is not determined whether there are other wireless interfaces in the state of being a target for direct connection, and the plurality of wireless interface targets for direct connection cannot be presented to the user. However, in the present exemplary embodiment, step S302 is executed on each of the plurality of wireless interfaces, so that it is possible to find out and present a plurality of wireless interface targets for direct connection. This enables performance of a direct connection setup with a more suitable wireless interface.

Next, a second exemplary embodiment will be described below. In the first exemplary embodiment, the examples are described in which if there are two or more directly-connectable wireless interfaces via the wireless LAN without involving an external access point, the selection screen is presented to the user to prompt the user to decide one wireless interface in step S304. In the second exemplary embodiment, an example in which the processing in step S304 is partially automated will be described. The configurations of the information processing apparatus 201 and the printer 251 that is the communication apparatus are similar to those in the first exemplary embodiment, so description thereof is omitted. The process of setting up a direct connection between the information processing apparatus 201 and the printer 251 (refer to FIG. 3) is similar to the process in the first exemplary embodiment except for the processing in step S304, therefore, description of the process other than step S304 is omitted.

Figure 11:
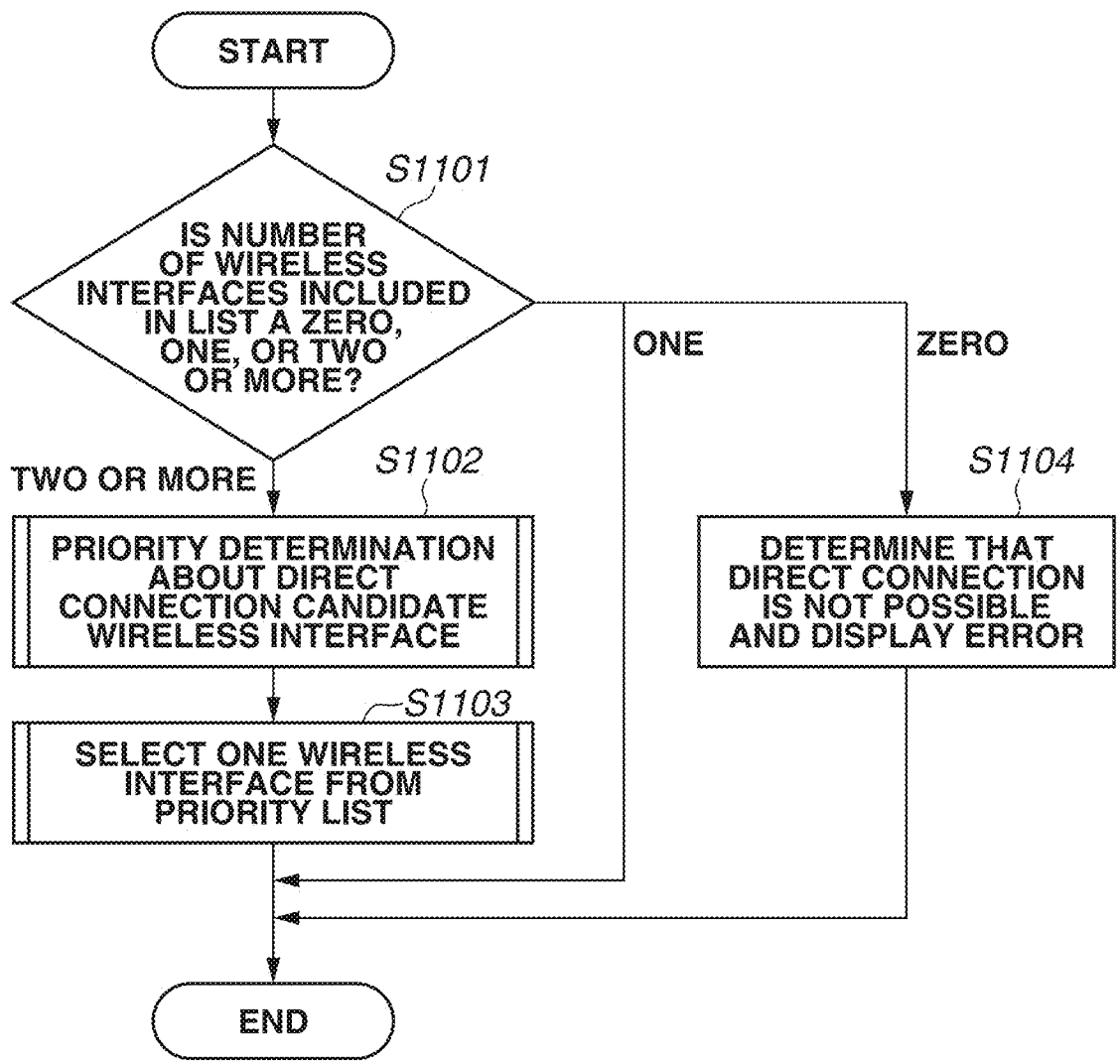
FIG. 11 is a flowchart illustrating a wireless interface decision process according to an exemplary embodiment.

FIG. 11 is a flowchart illustrating details of the wireless interface decision processing (step S304) in the present exemplary embodiment. The flowchart is implemented by, for example, the CPU 203 that reads out and executes a setup program (hereinafter, sometimes referred to simply as "program") stored in the external storage device 206, etc., on the RAM 205, as described in the first exemplary embodiment.

From step S1101, the processing branches into a next step based on the number of wireless interfaces contained in the list A extracted by step S302. More specifically, the number of wireless interfaces contained in the list A is counted to determine whether the number is two or more (plural). In step S1101, if it is determined that the number of wireless interfaces is two or more (TWO OR MORE in step S1101), the processing proceeds to step S1102. If the number of wireless interfaces is not two or more but one in step S1101 (ONE in step S1101), the one wireless interface is determined as a wireless interface to be used to set up a direct connection to the printer 251, and the processing ends. If the number of wireless interfaces is not two or more but zero in step S1101 (ZERO in step S1101), the processing proceeds to step S1104.

In step S1102, since the list A contains two or more wireless interfaces, the program first determines priorities from among the wireless interfaces contained in the list A (hereinafter, also referred to as "priority determination processing"). Details of the priority determination processing (step S1102) will be described below with reference to FIG. 12.

In step S1103, the program selects one wireless interface to use in setting up a direct connection based on the priorities determined in step S1102 (hereinafter, also referred to as "priority wireless interface decision processing"). Details of the priority wireless interface decision processing (step S1103) will be described below with reference to FIG. 13. If the program selects one wireless interface in step S1103, the process is ended.

In step S1104, since the list A contains no wireless interface, the program determines that it is an error state in which direct connection is not possible, and an error screen as illustrated in FIG. 10 is displayed as described in the first exemplary embodiment and the process ends.

[Priority Determination Processing (Step S1102)]

Figure 12:
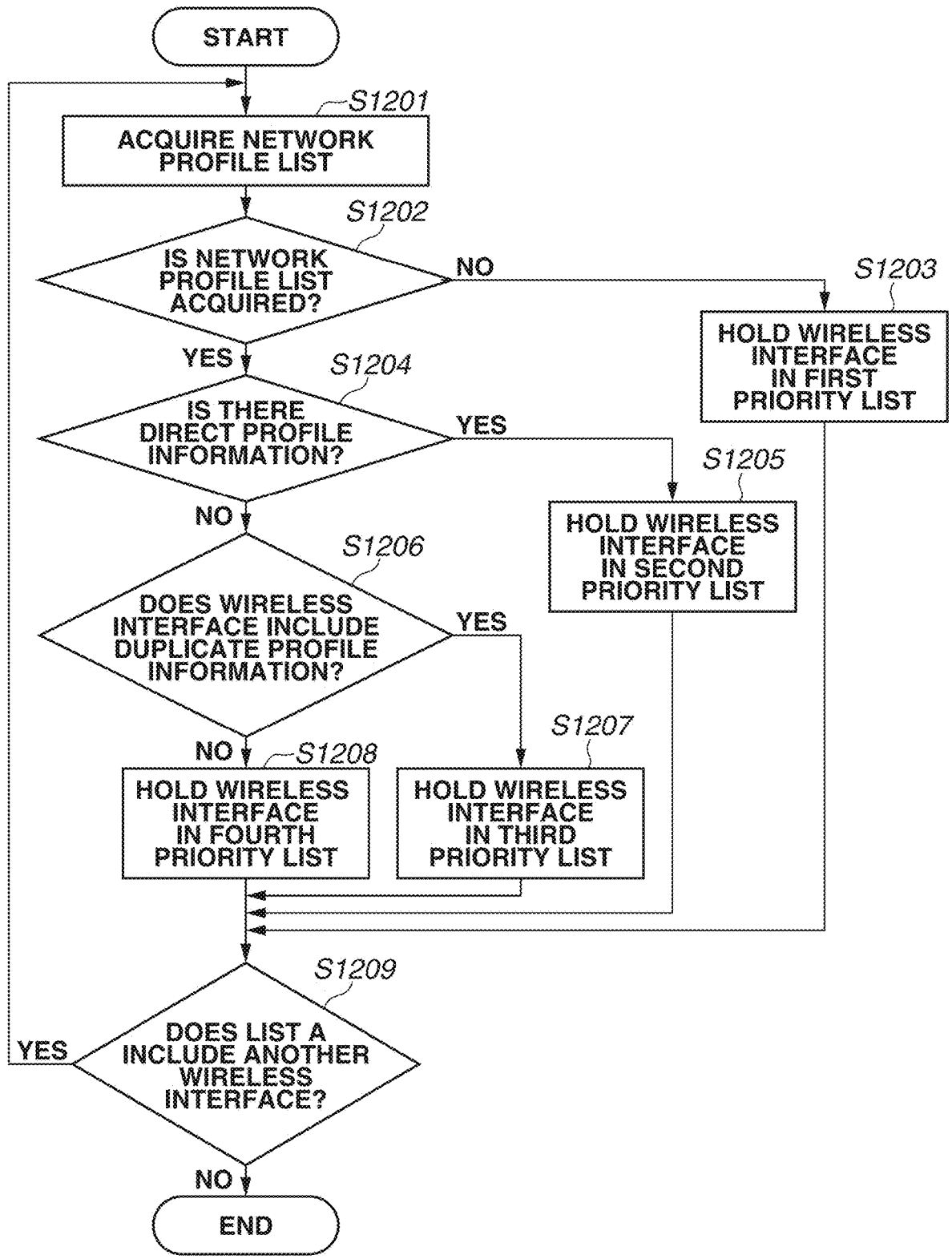
FIG. 12 is a flowchart illustrating a process of determining a priority of a wireless interface which is a target for direct connection according to an exemplary embodiment.

Details of the priority determination processing (step S1102) will be described below with reference to FIG. 12. In the process illustrated in FIG. 12, each step is sequentially executed on the plurality of wireless interfaces. The first wireless interface will be provisionally referred to as "wireless interface X".

In step S1201, the program acquires a network profile list associated with the wireless interface X using the API of the OS. The network profile is setting information stored by the OS when the wireless interface X is connected to the access point. For example, the OS stores in the ROM 204 a service set identifier (SSID), which is an identifier of the access point, a password for connecting to the SSID, etc. as setting information.

In step S1202, the program determines whether the network profile list is acquired based on a result of step S1201. If the network profile list is acquired (YES in step S1202), the processing proceeds to step S1204. If the network profile list is not acquired (NO in step S1202), the processing proceeds to step S1203. In step S1203, since the network profile list is not acquired, the program determines that the wireless interface X is not currently used for wireless LAN connection, and the wireless interface X is classified into and stored in a first priority list.

In step S1204, since the network profile list is acquired, the program determines whether the wireless interface X is currently or was previously directly connected. The determination in step S1204 is performed by referring to each SSID of the network profile list. More specifically, a character string unique at the time of direct connection is assigned to an SSID to use to connect directly to the printer 251 without involving an external access. Then, the program checks whether each SSID of the network profile list corresponds to the character string unique at the time of direct connection and determines whether the SSID is the network profile (direct profile information) at the time of direct connection. If it is determined that there is a network profile at the time of direct connection in the history (YES in step S1204), the processing proceeds to step S1205. If it is determined that there is no network profile at the time of direct connection (NO in step S1204), the processing proceeds to step S1206.

In step S1205, since there is a network profile indicating a direct connection, the program determines that the wireless interface X has a direct connection history, and the wireless interface X is classified into and stored in a second priority list.

In step S1206, since there is no network profile indicating a direct connection, the program executes next priority determination. More specifically, the program determines whether the wireless interface X includes in the history the network profile information that overlaps with the network profile of the wireless interface that is infrastructure-connected via the external access point. The wireless interface including the profile information that overlaps with the network profile of a currently infrastructure-connected wireless interface is less likely to be used by the user. This situation corresponds to, for example, a case in which the user purchases a new wireless interface compatible with a new wireless LAN standard and the new wireless interface is set up for infrastructure connection. More specifically, the wireless interface X is previously infrastructure-connected, but the new wireless interface is set for infrastructure connection, so that the wireless interface X is currently not in use.

In step S1207, the program classifies and stores the wireless interface X in a third priority list. Then, in step S1208, the program stores in a fourth priority list the wireless interface that does not satisfy the condition in step S1206. In step S1209, the program determines whether the list A includes another wireless interface Y. In this step, the priority determination processing is executed on every wireless interface included in the list A. Then, after the program classifies all the wireless interfaces into one of the first to fourth priority lists, the process ends.

[Priority Wireless Interface Decision Processing (Step S1103)]

Figure 13:
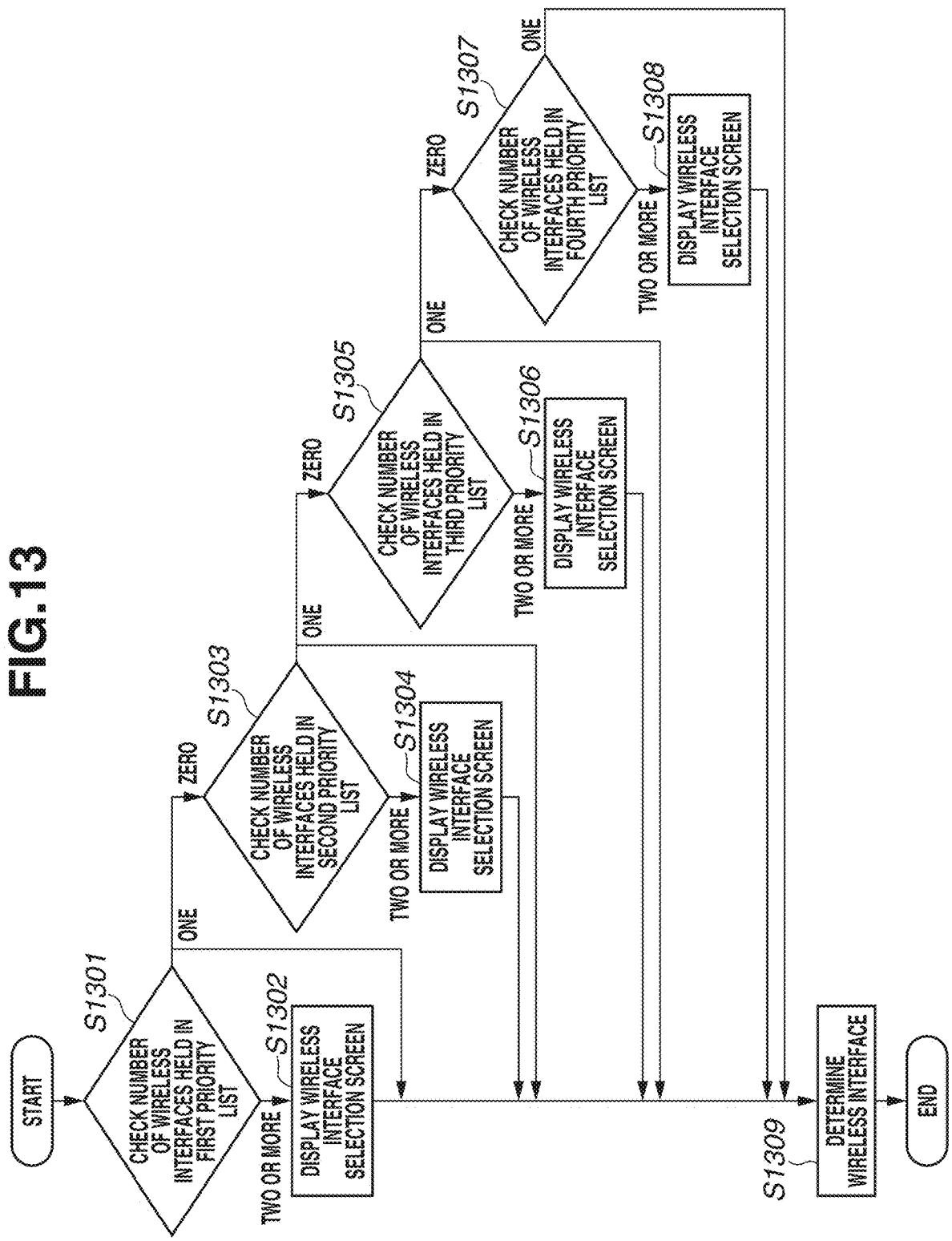
FIG. 13 is a flowchart illustrating a process of deciding one wireless interface from a priority list according to an exemplary embodiment.

Next, details of the priority wireless interface decision processing (step S1103) will be described below with reference to FIG. 13. FIG. 13 is a flowchart illustrating a process of deciding one wireless interface for use in direct connection based on the priorities classified in the priority determination processing (step S1102).

In step S1301, the program checks the number of wireless interfaces stored in the first priority list. Specifically, the number of wireless interfaces contained in the first priority list is counted to determine whether the number is two or more (whether the number is plural). In step S1301, if it is determined that the number of wireless interfaces is two or more (TWO OR MORE in step S1301), the processing proceeds to step S1302. If the number of wireless interfaces is not two or more but one in step S1301 (ONE in step S1301), the processing proceeds to step S1309. If the number of wireless interfaces is not two or more but zero in step S1301 (ZERO in step S1301), the processing proceeds to step S1303.

In step S1302, since there are two or more wireless interfaces of the first priority, the program determines that no further automatic determination is possible, and the selection screen as illustrated in FIG. 9 is displayed as in the first exemplary embodiment. In step S1303, since there is no wireless interface of the first priority, the program checks the number of wireless interfaces stored in the second priority list. In step S1303, if it is determined that the number of wireless interfaces is two or more (TWO OR MORE in step S1303), the processing proceeds to step S1304. If it is determined that the number of wireless interfaces is not two or more but one in step S1303 (ONE in step S1303), the processing proceeds to step S1309. In step S1303, if it is determined that the number of wireless interfaces is not two or more but zero (ZERO in step S1303), the processing proceeds to step S1305.

In step S1304, since there are two or more wireless interfaces of the second priority, the program determines that no further automatic determination is possible, and the selection screen as illustrated in FIG. 9 is displayed. In step S1305, since there is no wireless interface of the second priority, the program checks the number of wireless interfaces stored in a third priority list. In step S1305, if it is determined that the number of wireless interfaces is two or more (TWO OR MORE in step S1305), the processing proceeds to step S1306. If it is determined that the number of wireless interfaces is not two or more but one in step S1305 (ONE in step S1305), the processing proceeds to step S1309. In step S1305, if it is determined that the number of wireless interfaces is not two or more but zero (ZERO in step S1305), the processing proceeds to step S1307.

In step S1306, since there are two or more wireless interfaces of the third priority, the program determines that no further automatic determination is possible, and the selection screen as illustrated in FIG. 9 is displayed. In step S1307, since there is no wireless interface of the third priority, the program checks the number of wireless interfaces stored in a fourth priority list. In step S1307, if it is determined that the number of wireless interfaces is two or more (TWO OR MORE in step S1307), the processing proceeds to step S1308. If it is determined that the number of wireless interfaces is not two or more but one in step S1307 (ONE in step S1307), the processing proceeds to step S1309.

In step S1308, since there are two or more wireless interfaces of the fourth priority, the program determines that no further automatic determination is possible, and the selection screen as illustrated in FIG. 9 is displayed.

In step S1309, since one wireless interface is selected as a result of the previous processing, the program decides the one wireless interface as a wireless interface for use in setting up a direct connection, and the process ends.

As described above, in the present exemplary embodiment, if there is a plurality of wireless interface targets for direct connection, the program can narrow down the wireless interfaces to some extent. This reduces a user's selection time. In the present exemplary embodiment, an example is described in which the program presents to the user the selection screen (FIG. 9) for selecting the plurality of wireless interfaces contained in the priority lists in steps S1302, S1304, and S1306. Alternatively, the program can randomly select one wireless interface from the plurality of wireless interfaces contained in the priority lists instead of displaying the selection screen illustrated in FIG. 9. In this case, however, the user may desire to select a more suitable wireless interface. The wireless interfaces classified into the fourth priority list include wireless interfaces that should not be a target for a setup. Thus, as described above in the present exemplary embodiment, it is desirable to display the selection screen as illustrated in FIG. 9. In step S1308, it is desirable to display the selection screen as illustrated in FIG. 9 to prompt the user to make a choice.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition to the functions described above in the exemplary embodiment being realized by executing a program code read by a computer, an OS or the like running on the computer can execute some of or all the processing based on an instruction of the program code. Implementing the functions of the exemplary embodiments through the processing of the OS is also included within the scope of the disclosure.

A program code read from a storage medium can be written to a memory of a function extension board inserted in the computer or a function extension unit connected to the computer. Then, a processor, such as a CPU, of the function extension board or the function extension unit can execute a part of or all the processing based on an instruction of the written program code. Implementing the functions of the exemplary embodiments through the above-described processing is also included within the scope of the disclosure.

As described above, the present disclosure enables an information processing apparatus including a plurality of wireless interfaces to wirelessly directly connect to a communication apparatus as appropriate.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095917, filed May 12, 2017, which is hereby incorporated by reference herein in its entirety.

What is claimed is:

1. A method for controlling an information processing apparatus capable of performing direct connection with a communication apparatus via a wireless communication without involving an external access point, the method comprising:

performing a determination for each of a plurality of wireless interfaces installed on the information processing apparatus to determine whether said wireless interface is in a state of being a target for the direct connection with the communication apparatus via the wireless communication;

checking whether there is more than one wireless interface determined to be in the state of being the target for the direct connection; and specifying, from the wireless interfaces determined to be in the state of being the target for the direct connection, one wireless interface to be used for the direct connection with the communication apparatus in a case where there is more than one wireless interface determined to be in the state of being the target for the direct connection.

2. The method according to claim 1, further comprising displaying on a display unit a selection screen allowing a user to select from the wireless interfaces determined to be in the state of being the target for the direct connection, the one wireless interface to be used for the direct connection with the communication apparatus in the case where there is more than one wireless interfaces determined to be in the state of being the target for the direct connection, wherein the one wireless interface to be used for the direct connection with the communication apparatus is specified based on a choice made by the user on the selection screen.

3. The method according to claim 2, wherein the selection screen displays a connection state of each wireless interface together with each identification information about each wireless interface.

4. The method according to claim 1, further comprising determining a priority of the wireless interfaces in the case where there is more than one wireless interfaces determined to be in the state of being the target for the direct connection.

5. The method according to claim 1, further comprising attempting to acquire profile information, wherein the one wireless interface is classified into a first priority if the profile information about the one wireless interface is not acquired, and wherein the one wireless interface is classified into one of a plurality of priorities lower than the first priority based on the acquired profile information if the profile information about the one wireless interface is acquired.

6. The method according to claim 1, wherein a wireless interface in either a state of being unconnected to any external apparatus or a state of being connected via the direct connection with the communication apparatus is determined to be in the state of being the target for the direct connection with the communication apparatus.

7. The method according to claim 6, wherein a wireless interface being connected to an external device other than the communication apparatus is not determined to be in the state of being the target for the direct connection with the communication apparatus.

8. The method according to claim 1, wherein in a case where there is only one wireless interface determined to be in the state of being the target for the direct connection, the one wireless interface is specified as a wireless interface to be used for the direct connection with the communication apparatus.

9. The method according to claim 1, wherein the direct connection is wireless communication based on a standard of the Institute of Electrical and Electronics Engineers (IEEE) 802.11.

10. The method according to claim 1, wherein the information processing apparatus performs the direct connection with a printing apparatus, which is the communication apparatus, and executes printing.

11. A method for controlling an information processing apparatus capable of performing direct connection with a communication apparatus via a wireless communication without involving an external access point, the method comprising:
performing a determination for each of a plurality of wireless interfaces installed on the information processing apparatus to determine whether said wireless interface is in a state of being a target for the direct connection with the communication apparatus via the wireless communication;
displaying on a display unit a selection screen allowing a user to select from the wireless interfaces in the state of being the target for the direct connection, a wireless interface to be used for the direct connection with the communication apparatus in a case where there is more than one wireless interface determined to be in the state of being the target for the direct connection; and
specifying the wireless interface to be used for the direct connection with the communication apparatus based on a choice made by the user on the selection screen.

12. An information processing apparatus capable of performing direct connection with a communication apparatus via a wireless communication without involving an external access point, the information processing apparatus comprising:
at least one processor causing the information processing apparatus to act as:
a determination unit configured to perform a determination for each of a plurality of wireless interfaces installed on the information processing apparatus to determine whether said wireless interface is in a state of being a target for direct connection to the communication apparatus via the wireless LAN;
a checking unit configured to check whether there is more than one wireless interface determined to be in the state of being the target for the direct connection; and
a decision unit configured to specify from the wireless interfaces in the state of being the target for the direct connection, one wireless interface to be directly connected to the communication apparatus in a case where there is more than one wireless interface determined to be in the state of being the target for the direct connection.

13. An information processing apparatus capable of performing direct connection with a communication apparatus via a wireless communication without involving an external access point, the information processing apparatus comprising:
at least one processor causing the information processing apparatus to act as:
a determination unit configured to perform a determination for each of a plurality of wireless interfaces installed on the information processing apparatus to determine whether said wireless interface is in a state of being a target for direct connection to the communication apparatus via the wireless communication;
a display control unit configured to display on a display unit a selection screen prompting a user to select from the wireless interfaces in the state of being the target for the direct connection, a wireless interface to be directly connected to the communication apparatus in a case where there is more than one wireless interface determined to be in the state of the target for the direct connection; and
a decision unit configured to specify the wireless interface to be directly connected to the communication apparatus based on a choice made by the user on the selection screen.

14. The method according to claim 1, wherein the direct connection is a connection based on Wi-Fi Direct.

15. The method according to claim 1, wherein the direct connection is a connection using an access point function in the communication apparatus.

16. The method according to claim 11, further comprising checking whether there is more than one wireless interface determined to be in the state of being the target for the direct connection; and in a case where there is more than one wireless interface determined to be in the state of being the target for the direct connection, specifying one wireless interface to be used for the direct connection with the communication apparatus from the wireless interfaces determined to be in the state of being the target for the direct connection.

17. The method according to claim 11, wherein the selection screen displays a connection state of each wireless interface together with each identification information about each wireless interface.

18. The method according to claim 11, further comprising determining a priority of the wireless interfaces in the case where there is more than one wireless interfaces determined to be in the state of being the target for the direct connection is displayed on the display unit.

19. The method according to claim 11, further comprising attempting to acquire profile information,
wherein the one wireless interface is classified into a first priority if the profile information about the one wireless interface is not acquired, and
wherein the one wireless interface is classified into one of a plurality of priorities lower than the first priority based on the acquired profile information if the profile information about the one wireless interface is acquired.

20. The method according to claim 11, wherein a wireless interface in either a state of being unconnected to any external apparatus or a state of being connected via the direct connection with the communication apparatus is determined to be in the state of being the target for the direct connection with the communication apparatus.

21. The method according to claim 20, wherein a wireless interface being connected to an external device other than the communication apparatus is not determined to be in the state of being the target for the direct connection with the communication apparatus.

22. The method according to claim 11, wherein in a case where there is only one wireless interface determined to be in the state of being the target for the direct connection, the one wireless interface is specified as a wireless interface to be used for the direct connection with the communication apparatus.

23. The method according to claim 11, wherein the direct connection is wireless communication based on a standard of the Institute of Electrical and Electronics Engineers (IEEE) 802.11.

24. The method according to claim 11, wherein the information processing apparatus performs the direct connection with a printing apparatus, which is the communication apparatus, and executes printing.

25. The method according to claim 11, wherein the direct connection is a connection based on Wi-Fi Direct.

26. The method according to claim 11, wherein the direct connection is a connection using an access point function in the communication apparatus.

\* \* \* \* \*